United States Patent Office 3,486,412
Patented Dec. 30, 1969

3,486,412
FAST CLAMPING DEVICE ON MACHINE TOOLS ESPECIALLY FOR CONICAL TOOLS
Wilhelm Schraub, Beckrath-Wickrath (Niers), and Toni Becker, Rheydt, Rhineland, Germany, assignors to Scharmann & Co., Rheydt, Germany
Filed Apr. 28, 1967, Ser. No. 634,768
Claims priority, application Germany, Apr. 30, 1966, Sch 38,915
Int. Cl. B23c 7/00, 9/00
U.S. Cl. 90—11   3 Claims

ABSTRACT OF THE DISCLOSURE

The present invention concerns a fast clamping device for use in connection with machine tools having a conical shaft, which tools are insertable into a corresponding conical bore of the boring spindle or the like of a machine tool, while between a pulling rod and the tool there is provided and connected thereto, a first tubular member having that end thereof which is adjacent to said pull rod provided with an outer ring of teeth overlapped in coupling engagement by teeth of a second tubular member connected to said pull rod, said teeth of said second tubular member being in front of the teeth of said first tubular member when looking in axial direction of said boring spindle from the front end to the rear end thereof, said boring spindle being provided with means for engagement with the tool to prevent a rotary movement thereof relative to the boring spindle.

---

The present invention relates to a fast clamping device on machine tools, especially for tools with a conical shank which is insertable in a corresponding conical bore of the boring spindle or the like of the machine by means of an intermediate member arranged between a pulling bar and the tool and connected therto, while the tool is secured against rotation about its longitudinal axis by being engaged by the boring spindle.

A clamping device for conical tools in connection with boring spindles of machine tools has become known, according to which, between the tool and a pulling rod, there is provided a threaded head having a thread each at both ends. These two ends are on one hand adapted to be screwed into the tool, and on the other hand into and unto the pulling rod. This intermediate member is exchangeable so that if one of the threads is damaged it is not required to exchange the tool, but merely the threaded head.

With other heretofore known designs of clamping devices, the pulling rod is provided with a hardened thread portion which engages a corresponding hardened inner thread of the tool.

It is an object of the present invention to improve heretofore known clamping devices of the general type set forth above.

It is a further object of this invention to provide a clamping device on machine tools, especially for conical tools, which will avoid damage to the thread and will permit a fast clamping of the tool without great efforts.

Still another object of this invention consists in the provision of a clamping device as set forth in the preceding paragraphs in which for carrying out the clamping operation, it is merely necessary to insert the tool into the boring spindle while the subsequent tightening can be carried out after the arresting device at the front end of the boring spindle has become effective and the tool has been released by the operator.

It is a still further object of this invention to provide a device set forth above which can be mounted on heretofore known machine tools without major changes therein.

Still another object of this invention consists in providing a device as outlined in the preceding paragraphs which will be space-saving and can be produced at low costs.

These and other objects and advantages of the invention will appear more clearly from the following specification in connection with the accompanying drawings in which FIG. 1 is a longitudinal section through the boring spindle.

Figure 1:
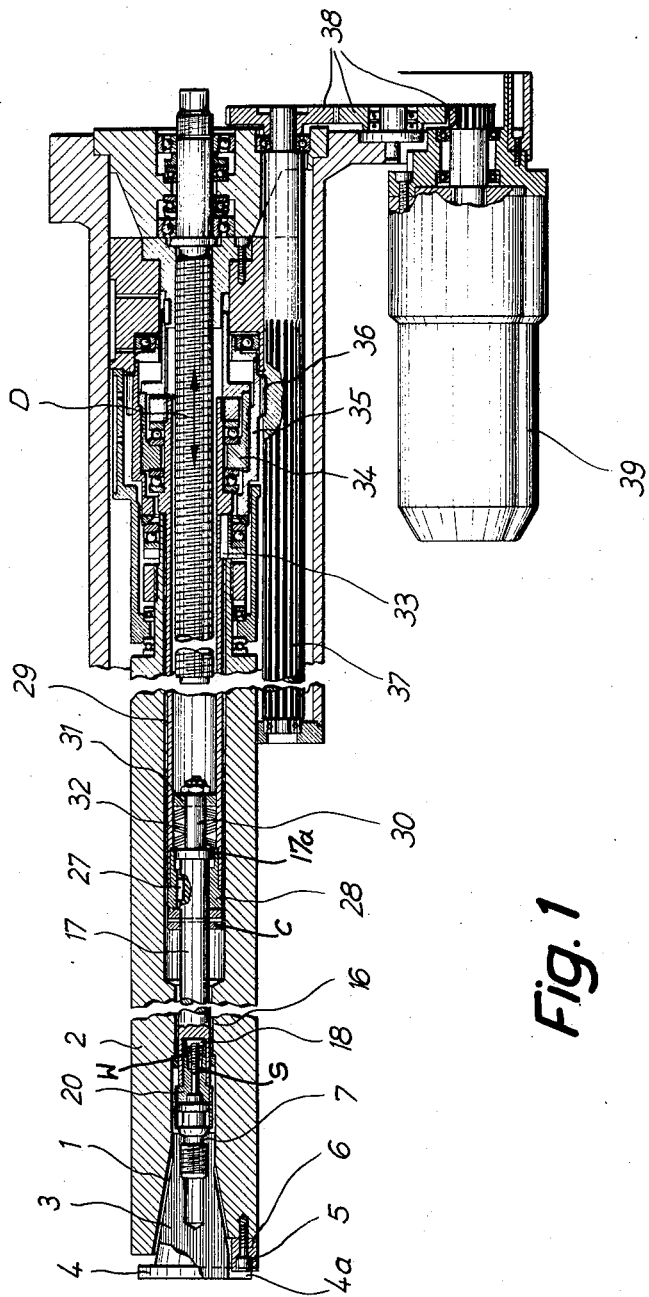
Figure 3:
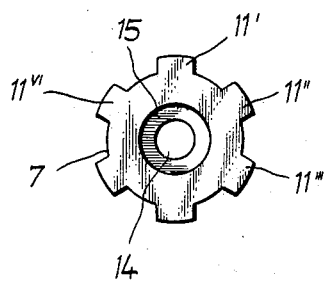
FIG. 3 shows a view of FIG. 2 as seen in the direction of arrow A.

A fast clamping device for machine tools, especially for tools with a conical shank, according to the present invention, is characterized primarily in that the intermediate member has that end thereof which is adjacent to the pulling rod provided with an outer gear ring, the teeth of which are engaged from behind by teeth of an inner gear ring pertaining to a bushing to be connected with the pulling rod, so as to effect a coupling engagement between said teeth of said outer gear ring and said inner gear ring, while the pulling rod, which is secured against rotation relative to the boring spindle, is adjustable in its longitudinal direction.

The invention also comprises an inverse arrangment according to which the intermediate member is provided with a bushing with an inner gear ring, while the gear rack is provided with a portion carrying an outer gear ring.

The longitudinal movement of the pulling rod is preferably realized by a reversible clamping motor and a sliding nut with thread. In order to permit the intermediate member and the bushing to be firmly connected to the tool or pulling rod, the intermediate member and the bushing are, in addition to being secured to the tool and the pulling rod, secured by one clamping switch each. An elastic clamping and holding of the tool may be realized by having the rear end of the pulling rod extending into a pulling pipe longitudinally displaceable by the clamping motor, and by providing a spring between the motor and said rod.

The number and arrangement of the teeth of the intermediate member and of the bushing is in conformity with the invention so selected that the teeth will engage each other in a coupling manner when the tool is secured by the arresting device on the boring spindle against rotation relative to the boring spindle.

Referring now to the drawings in detail, the conical shank 3 of the tool is inserted into the conical bore 1 of the boring spindle 2. This tool is in a manner known per se provided with an annular portion 4, the section 4a of which has an extension, a recess or a notch engaged by a portion 5 of an arresting device 6 pertaining to the boring spindle 2. This arresting device prevents the tool from turning relative to the boring spindle.

Figure 2:
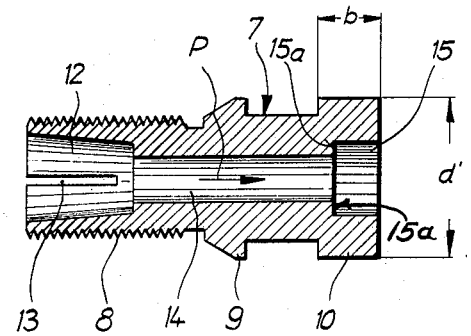
FIG. 2 shows a section through an intermediate member of the device according to the invention.

An intermediate member 7 is screwed into the right-hand end (with regard to the drawing) of the conical shank 3 of the tool. The said intermediate member 7 is provided with an outer thread 8 (FIG. 2) and may have a collar 9. One end of the intermediate member 7 has a gear ring 10 with, for instance, six teeth, $11'$, $11''$, $11'''$ . . ., $11^{VI}$. That section of the intermediate member 7 which faces away from the gear ring 10 has a conical inner bore 12, which at two oppositely located wall portions, is provided with slots 13. The bore 12 continues in the form of a cylindrical bore 14 of a reduced cross-section and leads into a round recess 15.

Figure 4:
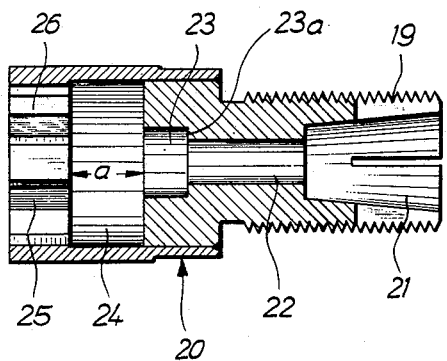
FIG. 4 is a section through a sleeve for the pulling rod for use in connection with the present invention.

For purposes of clamping the intermediate member 12 in the conical portion 3 of the tool, a truncated cone-shaped wedge member is, by means of a central threaded bore, inserted into the bore 12 and is tightened in the direction of the arrow P by means of a screw, the head of which rests on the shoulder 15a of the recess 15. The boring spindle 2 is provided with a bore 16 through which extends a pulling rod 17, the front end of which has a bore 18 with an inner thread. The threaded portion 19 of a bushing 20 (FIG. 4) is adapted to be screwed into said inner thread. A truncated cone-shaped wedge member W is insertable into the conical bore 21 of the thread portion 19. This last mentioned wedge member is adapted to be tightened by a screw S, the shank of which is located in the cylindrical bore 22, while the head of said last mentioned screw is received in the recess 23. The head of the screw can rest on the shoulder 23a.

Figure 5:
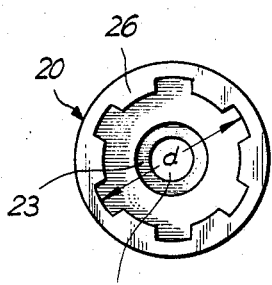
FIG. 5 is a view of the bushing of FIG. 4 as seen in the direction of the arrow B.

The bushing has a smooth cylindrical section 24, the depth $a$ of which is somewhat greater than the width $b$ of the gear ring 10 of the intermediate member 7. The gear ring 10 can thus be located in the recess 24 and can be turned therein because the inner diameter $d$ (FIG. 5) of bushing 20 is slightly greater than the outer diameter $d'$ of the gear ring 10.

Bushing 20 has an inner gear ring 25 with a number of teeth which correspond to the number of the teeth 11' ... to 11$^{VI}$ of the gear ring 10. Also, the spacing of the teeth 26 of the gear ring 25 and of the teeth 11 of the gear ring 10 is the same. The gear rings 10, 25 are so designated that the gear ring 10 can first be introduced into the chamber 24 of bushing 20, whereupon the gear ring can be turned by a tool in such a way that the teeth 11 and 26 will overlap. The arresting device 6 on the boring spindle will prevent the intermediate member 7 from rotating, whereas the bushing 20, is, by means of the pulling rod 17, held so that it cannot turn in the boring spindle. The pulling rod 17 is, by means of a key and grove 27, non-rotatably connected to the head portion 28 of a pulling pipe 29, but the pulling rod 17 can move relative to the pulling pipe 29 in longitudinal direction to a slight extent. The pulling rod 17 has to this end, a bar-shaped extension 30 with a plate 31 for a spring packet 32, the front end of which rests against a part 17a slidable extension 30. By means of this spring packet, the tool is resiliently clamped and held in its longitudinal direction.

The pulling pipe 29 is likewise by means of a key and groove 33 held in the boring spindle 2 in such a way that it cannot turn relative thereto and is adapted by means of a threaded sleeve 34 to move in the longitudinal direction as indicated by the double arrow D. This threaded sleeve is arranged in a toothed nut 35 provided with an inner thread. The outer thread 36 of said sleeve engages a splined shaft 37 adapted to be driven by the clamping motor 39 through a transmission 38.

The tool is fixedly connected to the intermediate member 7 to which end the wedge resting in bore 12 is tightened. The bushing 20 is firmly threadedly connected to the pulling rod 17. For purposes of tightening the tool, it will suffice to insert the latter with its conical portion 3 into the conical bore 1 and to turn said tool until the arresting device 6 becomes effective, so that the tool shank 3 now rests non-rotatably in the boring spindle 2. When inserting the conical shank 3 into the boring spindle 2, the gear ring ring 10 has entered the chamber 24 of the bushing 20 and in view of the turning of the tool, when the arresting device 6 has become effective, the teeth 11 move behind the teeth 26. Thereupon, the operator can release the tool and it is not necessary to hold the tool until the tool starts to tighten or has tightened in the longitudinal direction. Subsequently, the reversible motor 39 may be actuated by means of which the pulling pipe 29 is longitudinally adjusted through the intervention of transmision 38, splined shaft 37, clamping nut 35 and threaded sleeve 34. This pipe acts upon the sping packet 32 which exerts a corresponding longitudinal pull upon the pulling rod 17, bushing 20 of which with its toothed ring 25, grasps the teeth 11 of the toothed ring 10 of the intermediate member 7 and thus, presses the conical shaft 3 of the tool against the wall of the conical bore 1. For purposes of loosening and withdrawing the tool, the motor 19 is reversed, the pulling rod is displaced in leftward direction with regard to FIG. 1, the spring packet 32 relaxes, and the pulling rod 29 presses against the clamping ring connected to pulling rod 17 so that the latter pushes shank 3 out of the bore 1. The tool can be withdrawn from its seat after the arresting device 6 has been made ineffective.

It is, of course, to be understood that the present invention is by no means limited to the particular design and structure shown in the drawings, but also comprises any modifications within the scope of the appended claims. Thus, instead of the illustrated number of teeth, also a higher or lower number of teeth may be provided on the gear rings. Furthermore, the intermediate member may be provided with an inner gear ring and the part 20 may be provided with an outer gear ring.

What we claim is:

1. In combination with a boring spindle having an axial bore therethrough, the front portion of which comprises a conical part for receiving a conical shank forming part of a tool and being provided axially with a bore: a first tubular member arranged in said axial bore of said boring spindle adjacent said conical part and having one end portion provided with an outer thread provided with an axial slotted conical bore and for engaging a threaded bore of a conical tool shank and having its other end portion provided with outer peripheral teeth, wedge means within said slotted bore and operable to be moved into said slotted conical bore for spreading said threaded end bore outwardly to thereby clamp said outwardly threaded portion to a tool to be clamped in said conical part of the axial bore of said boring machine, a second tubular member arranged in substantially axial alignment with said first tubular member and having an inner tooth ring with the teeth thereof in overlapping and coupling engagement with the teeth of said first tubular member, the teeth of said second tubular member being located behind the teeth of said first tubular member when looking in the axial direction of said spindle bore from the rear portion to the front portion thereof, a pull rod reciprocably arranged within said spindle bore and in substantially axial alignment with said second tubular member while being firmly connected thereto, means for preventing rotation of said pull rod relative to said spindle, and actuating means operatively connected to said pull rod for selectively moving the same in one and the opposite axial direction thereof for clamping and unclamping a tool received in said conical bore part of said spindle.

2. In combination with a boring spindle having an axial bore therethrough, the front portion of which comprises a conical part for receiving a conical shank forming part of a tool and being provided axially with a bore: a first tubular member arranged in said axial bore of said boring spindle adjacent said conical part and having one end portion provided with an outer thread for engaging a threaded bore of a conical tool shank and having its other end portion provided with outer peripheral teeth, a second tubular member arranged in substantially axial alignment with said first tubular member and having an inner tooth ring with the teeth thereof in overlapping and coupling engagement with the teeth of said first tubular member, said inner tooth ring of said second tubular member being arranged at one end portion thereof, while the other end portion of said second tubular member is provided with an outer peripheral thread and with an axial slotted conical bore, the teeth of said second tubular member being located behind the teeth of said first tubular member when looking in the axial direction of said spindle bore from the rear portion to the front portion thereof, a pull rod reciprocably arranged within said spindle bore and in substantially axial alignment with said second tubular member while being firmly connected thereto, said pull rod having a threaded bore threadedly engaging said outer peripheral thread, wedge means arranged within said slotted bore of said second tubular member and operable to spread said outer peripheral thread to thereby firmly clamp said second tubular member and said pull rod together, means for preventing rotation of said pull rod relative to said spindle, and actuating means operatively connected to said pull rod for selectively moving the same in one and the opposite axial direction thereof for clamping and unclamping a tool received in said conical bore part of said spindle.

3. In combination with a boring spindle having an axial bore therethrough, the front portion of which comprises a conical part for receiving a conical shank forming part of a tool and being provided axially with a bore: a first tubular member arranged in said axial bore of said boring spindle adjacent said conical part and having one end portion provided with an outer thread for engaging a threaded bore of a conical tool shank and having its other end portion provided with outer peripheral teeth, a second tubular member arranged in substantially axial alignment with said first tubular member and having an inner tooth ring with the teeth thereof in overlapping and coupling engagement with the teeth of said first tubular member, the teeth of said second tubular member being located behind the teeth of said first tubular member when looking in the axial direction of said spindle bore from the rear portion to the front portion thereof, a pull rod reciprocably arranged within said spindle bore and in substantially axial alignment with said second tubular member while being firmly connected thereto, means for preventing rotation of said pull rod relative to said spindle, and actuating means operatively connected to said pull rod for selectively moving the same in one and the opposite axial direction thereof for clamping and unclamping a tool received in said conical bore part of said spindle, said actuating means including a reversible motor for reciprocable adjustment of said pull rod, transmission means including a pinion shaft drivingly connected to said motor, and a slidable nut means including an inner threaded portion and an outer tooth portion and a threaded sleeve rotatably mating with said inner threaded portion collectively drivingly connected to said transmission means and said pull rod, said threaded sleeve however having stability against reciprocable adjustment whereby said slidable nut means is subject to reciprocable adjustment by said pinion shaft driven by said motor.

References Cited

UNITED STATES PATENTS

| | | | |
|---|---|---|---|
| 1,961,129 | 6/1934 | De Haas et al. | 90—11.1 |
| 2,441,046 | 5/1948 | Turrettiri | 90—11.1 |
| 2,667,819 | 2/1954 | De Vlieg | 90—11.1 |
| 2,685,823 | 8/1954 | Kaiser | 90—11.1 |
| 2,994,250 | 8/1961 | Walter et al. | 90—11.1 |
| 3,110,330 | 11/1963 | Heth et al. | 90—11.1 |
| 3,118,345 | 1/1964 | Bullard et al. | 90—11.1 |
| 3,288,032 | 11/1966 | Pankonin et al. | 90—11.1 |

GERALD A. DOST, Primary Examiner

U.S. Cl. X.R.

77—3